United States Patent
Kwon et al.

(10) Patent No.: US 10,408,306 B2
(45) Date of Patent: Sep. 10, 2019

(54) MULTI-STAGE TRANSMISSION FOR VEHICLE

(71) Applicants: HYUNDAI MOTOR COMPANY, Seoul (KR); KIA Motors Corporation, Seoul (KR)

(72) Inventors: Hyun Sik Kwon, Seoul (KR); Seong Wook Ji, Gunpo-si (KR); Ki Tae Kim, Incheon (KR); Ju Hyeon Park, Suwon-si (KR); Il Han Yoo, Hwasun-eup (KR); Seong Wook Hwang, Gunpo-si (KR); Won Min Cho, Hwaseong-si (KR)

(73) Assignees: HYUNDAI MOTOR COMPANY, Seoul (KR); KIA Motor Corporation, Seoul (KR)

( * ) Notice: Subject to any disclaimer, the term of this patent is extended or adjusted under 35 U.S.C. 154(b) by 96 days.

(21) Appl. No.: 15/823,186

(22) Filed: Nov. 27, 2017

(65) Prior Publication Data
US 2019/0078653 A1    Mar. 14, 2019

(30) Foreign Application Priority Data
Sep. 11, 2017    (KR) .......... 10-2017-0115626

(51) Int. Cl.
*F16H 3/66*    (2006.01)
*F16H 3/44*    (2006.01)

(52) U.S. Cl.
CPC ......... *F16H 3/66* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC ............. F16H 3/66; F16H 2003/445; F16H 2200/0065; F16H 2200/2012; F16H 2200/2046
See application file for complete search history.

(56) References Cited

U.S. PATENT DOCUMENTS

| | | | | |
|---|---|---|---|---|
| 3,971,267 A | * | 7/1976 | Murakami | F16H 3/666 475/276 |
| 4,046,031 A | * | 9/1977 | Ott | F16H 3/66 475/280 |
| 10,260,601 B1 | * | 4/2019 | Kwon | F16H 3/66 |
| 10,267,387 B1 | * | 4/2019 | Yoo | F16H 3/66 |
| 2015/0267786 A1 | | 9/2015 | Hart | |

(Continued)

*Primary Examiner* — David R Morris
(74) *Attorney, Agent, or Firm* — McDonnell Boehnen Hulbert & Berghoff LLP

(57) ABSTRACT

A multi-stage transmission for a vehicle includes: an input shaft, an output shaft, a first, a second, a third, and a fourth planetary gear device, each of which is disposed between the input shaft and the output shaft, and six gear-shift elements connected to rotation elements of the planetary gear devices. A first rotation element of the third planetary gear device is fixedly connected to a first rotation element of the first planetary gear device and to a first rotation element of the second planetary gear device. A second rotation element of the third planetary gear device is fixedly connected to a third rotation element of the first planetary gear device and to a third rotation element of the fourth planetary gear device. A third rotation element of the third planetary gear device is selectively connected to the input shaft.

7 Claims, 2 Drawing Sheets

(56) References Cited

U.S. PATENT DOCUMENTS

| | | | |
|---|---|---|---|
| 2019/0072157 A1* | 3/2019 | Kwon | F16H 3/66 |
| 2019/0085944 A1* | 3/2019 | Yoo | F16H 3/66 |
| 2019/0085948 A1* | 3/2019 | Yoo | F16H 3/66 |
| 2019/0085949 A1* | 3/2019 | Kwon | F16H 3/66 |
| 2019/0085950 A1* | 3/2019 | Kwon | F16H 3/66 |
| 2019/0085951 A1* | 3/2019 | Kwon | F16H 3/66 |
| 2019/0093741 A1* | 3/2019 | Kwon | F16H 3/66 |
| 2019/0120333 A1* | 4/2019 | Yoo | F16H 3/66 |

* cited by examiner

FIG. 2

| GEAR STAGE | CL1 | CL2 | B1 | B2 | CL3 | CL4 | GEAR RATIO |
|---|---|---|---|---|---|---|---|
| 1ST |  | ● | ● |  | ● |  | 4.718 |
| 2ND |  | ● | ● | ● |  |  | 3.388 |
| 3RD |  | ● |  | ● | ● |  | 2.567 |
| 4TH |  | ● |  | ● |  | ● | 1.733 |
| 5TH | ● | ● |  | ● |  |  | 1.400 |
| 6TH | ● |  |  | ● |  | ● | 1.257 |
| 7TH | ● |  |  |  | ● | ● | 1.000 |
| 8TH | ● |  |  | ● | ● |  | 0.900 |
| 9TH | ● |  | ● |  | ● |  | 0.763 |
| REV | ● |  | ● | ● |  |  | 0.548 |
| REV |  | ● | ● |  |  | ● | −3.436 |

MULTI-STAGE TRANSMISSION FOR VEHICLE

CROSS REFERENCE TO RELATED APPLICATION

The present application claims priority of Korean Patent Application No. 10-2017-0115626 filed on Sep. 11, 2017, the entire contents of which is incorporated herein by reference.

BACKGROUND OF THE DISCLOSURE

1. Field of the Disclosure

The present disclosure relates to a multi-stage transmission for a vehicle and, more specifically, to technology for implementing ten forward gears and one backward gear so as to improve the fuel efficiency of a vehicle.

2. Description of the Prior Art

Recently, a rise in oil prices has motivated automobile manufacturers throughout the world to compete with respect to improvements in fuel efficiency. Further, efforts have been made to improve engine fuel efficiency and decrease engine weight through technology such as downsizing.

Meanwhile, fuel efficiency improvement methods for a transmission mounted in a vehicle include a method of increasing the number of gear stages to allow an engine to operate at a more efficient operating point so as to ultimately improve the fuel efficiency of the vehicle.

Further, an increase in the number of gear stages may allow an engine to operate in a relatively low RPM band, thereby further improving the quietness of a vehicle.

However, as the number of gear stages of a transmission increases, the number of internal components configuring the transmission also increase, so that the mountability, production costs, weight, and efficiency of the transmission may be negatively impacted. Therefore, it may be important to design a transmission that can achieve maximum efficiency using a small number of components and a relatively straightforward configuration in order to maximize fuel efficiency through an increase in the number of gear stages.

The foregoing description of the background art is only for the purpose of promoting understanding of the background of the present disclosure and should not be construed as an admission that the description is a prior art which is already known to a person skilled in the art.

SUMMARY OF THE DISCLOSURE

An aspect of the present disclosure is to provide a multi-stage transmission for a vehicle, which can implement ten forward gears and one backward gear using a relatively small number of components and a relatively straightforward configuration, so that the transmission can achieve engine operation at an optimum operating point to maximize the fuel efficiency of the vehicle, and can achieve a more quiet engine operation and thus improve the quietness of the vehicle.

In accordance with the above aspect, a multi-stage transmission for a vehicle according to the present disclosure may include: an input shaft and an output shaft; a first planetary gear device, a second planetary gear device, a third planetary gear device, and a fourth planetary gear device, each of which is disposed between the input shaft and the output shaft to transfer a rotational force and has three rotation elements; and six gear-shift elements connected to the rotation elements of the planetary gear devices, wherein a first rotation element of the third planetary gear device is fixedly connected to a first rotation element of the first planetary gear device and to a first rotation element of the second planetary gear device, and a second rotation element of the third planetary gear device is fixedly connected to a third rotation element of the first planetary gear device and to a third rotation element of the fourth planetary gear device; a second rotation element of the first planetary gear device is fixedly connected to a third rotation element of the second planetary gear device; and a second rotation element of the fourth planetary gear device is fixedly connected to the output shaft.

A third rotation element of the third planetary gear device may be selectively connected to the input shaft; the second rotation element of the first planetary gear device may be selectively connected to the input shaft; the first rotation element of the second planetary gear device may be selectively connected to each of a first rotation element and the second rotation element of the fourth planetary gear device, and a second rotation element of the second planetary gear device may be selectively connected to a transmission case by one of the gear-shift elements; and the first rotation element of the fourth planetary gear device may be selectively connected to the transmission case by another one of the gear-shift elements.

The third planetary gear device, the first planetary gear device, the second planetary gear device, and the fourth planetary gear device may be arranged in order along an axial direction from the input shaft toward the output shaft.

The gear-shift elements include a first and a second brake. The second rotation element of the second planetary gear device may be selectively connected to the transmission case by the first brake; and the first rotation element of the fourth planetary gear device may be selectively connected to the transmission case by the second brake.

The gear-shift elements include a first, a second, a third, and a fourth clutch. The second rotation element of the first planetary gear device and the input shaft may be selectively connected by the first clutch; the third rotation element of the third planetary gear device and the input shaft may be selectively connected by the second clutch; the first rotation element of the second planetary gear device and the first rotation element of the fourth planetary gear device may be selectively connected by the third clutch; and the first rotation element of the second planetary gear device and the second rotation element of the fourth planetary gear device may be selectively connected by the fourth clutch.

The first rotation element, the second rotation element, and the third rotation element of the first planetary gear device comprise a first sun gear, a first carrier, and a first ring gear, respectively; the first rotation element, the second rotation element, and the third rotation element of the second planetary gear device comprise a second sun gear, a second carrier, and a second ring gear, respectively; the first rotation element, the second rotation element, and the third rotation element of the third planetary gear device comprise a third sun gear, a third carrier, and a third ring gear, respectively; and the first rotation element, the second rotation element, and the third rotation element of the fourth planetary gear device comprise a fourth sun gear, a fourth carrier, and a fourth ring gear, respectively.

In addition, a multi-stage transmission for a vehicle according to the present disclosure includes: a first planetary gear device, a second planetary gear device, a third planetary gear device, and a fourth planetary gear device, each of which has three rotation elements; six gear-shift elements configured to variably provide a frictional force; and eight rotational shafts configured to connect with the rotation elements of the planetary gear devices, wherein a first rotational shaft is an input shaft; a second rotational shaft is directly connected to a first rotation element of the third planetary gear device, to a first rotation element of the first planetary gear device, and to a first rotation element of the second planetary gear device; a third rotational shaft is directly connected to a second rotation element of the third planetary gear device, to a third rotation element of the first planetary gear device, and to a third rotation element of the fourth planetary gear device; a fourth rotational shaft is directly connected to a third rotation element of the third planetary gear device; a fifth rotational shaft is directly connected to a second rotation element of the first planetary gear device and to a third rotation element of the second planetary gear device; a sixth rotational shaft is directly connected to a second rotation element of the second planetary gear device; a seventh rotational shaft is directly connected to a first rotation element of the fourth planetary gear device; and an eighth rotational shaft corresponds to an output shaft and is directly connected to a second rotation element of the fourth planetary gear device.

The third planetary gear device, the first planetary gear device, the second planetary gear device, and the fourth planetary gear device may be arranged in order along an axial direction from the input shaft toward the output shaft.

The six gear-shift elements comprise: a first brake may be installed between the sixth rotational shaft and a transmission case; a second brake may be installed between the seventh rotational shaft and the transmission case; a first clutch may be installed between the first rotational shaft and the fifth rotational shaft; a second clutch may be installed between the first rotational shaft and the fourth rotational shaft; a third clutch may be installed between the second rotational shaft and the seventh rotational shaft; and a fourth clutch may be installed between the second rotational shaft and the eighth rotational shaft.

The present disclosure can implement ten forward gears and one backward gear using a relatively small number of components and a relatively simple configuration, so that the present disclosure can achieve engine operation at an optimum operating point to maximize the improvement of fuel efficiency of a vehicle, and can achieve more quiet engine operation and thus improve the quietness of the vehicle.

BRIEF DESCRIPTION OF THE DRAWINGS

The above and other aspects, features and advantages of the present disclosure will be more apparent from the following detailed description taken in conjunction with the accompanying drawings.

FIG. 2 is an operation mode table illustrating the implementation of each gear stage by the transmission of FIG. 1.

DETAILED DESCRIPTION OF THE EXEMPLARY EMBODIMENTS

Figure 1:
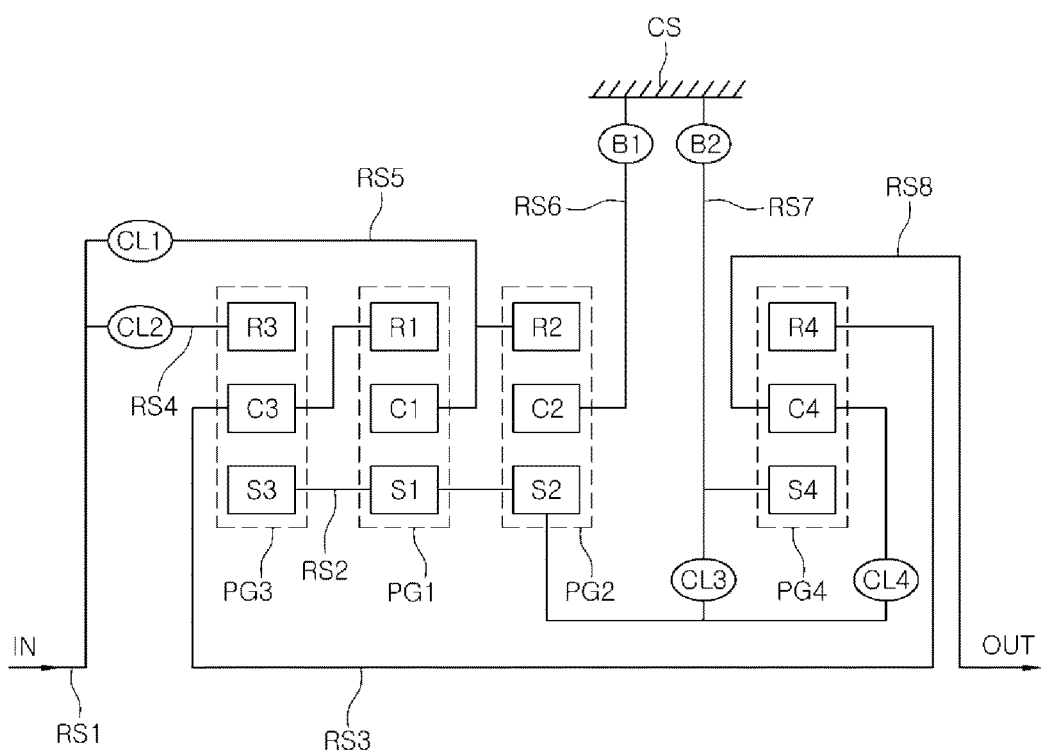
FIG. 1 is a configuration diagram of a multi-stage transmission for a vehicle according to the present disclosure.

Referring to FIG. 1, a multi-stage transmission for a vehicle according to the present disclosure includes: an input shaft (IN) and an output shaft (OUT); a first planetary gear device (PG1), a second planetary gear device (PG2), a third planetary gear device (PG3), and a fourth planetary gear device (PG4), each of which is disposed between the input shaft (IN) and the output shaft (OUT) to transfer a rotational force and has three rotation elements; and six gear-shift elements connected to the rotation elements of the planetary gear devices.

A first rotation element (S3) of the third planetary gear device (PG3) is fixedly connected to a first rotation element (S1) of the first planetary gear device (PG1) and to a first rotation element (S2) of the second planetary gear device (PG2), a second rotation element (C3) of the third planetary gear device (PG3) is fixedly connected to a third rotation element (R1) of the first planetary gear device (PG1) and to a third rotation element (R4) of the fourth planetary gear device (PG4), and a third rotation element (R3) of the third planetary gear device (PG3) is selectively connected to the input shaft (IN).

A second rotation element (C1) of the first planetary gear device (PG1) is fixedly connected to a third rotation element (R2) of the second planetary gear device (PG2), and is selectively connected to the input shaft (IN).

The first rotation element (S2) of the second planetary gear device (PG2) is selectively connected to each of a first rotation element (S4) and a second rotation element (C4) of the fourth planetary gear device (PG4). A second rotation element (C2) of the second planetary gear device (PG2) is selectively connected to a transmission case (CS) by one of the gear-shift elements.

The first rotation element (S4) of the fourth planetary gear device (PG4) is selectively connected to the transmission case (CS) by another one of the gear-shift elements. The second rotation element (C4) of the fourth planetary gear device (PG4) is fixedly connected to the output shaft (OUT).

In an embodiment of the present disclosure, as shown in FIG. 1, the third planetary gear device (PG3), the first planetary gear device (PG1), the second planetary gear device (PG2), and the fourth planetary gear device (PG4) are arranged in order along an axial direction from the input shaft (IN) toward the output shaft (OUT).

The second rotation element (C2) of the second planetary gear device (PG2) is selectively connected to the transmission case (CS) by a first brake (B1) from among the gear-shift elements. The first rotation element (S4) of the fourth planetary gear device (PG4) is selectively connected to the transmission case (CS) by a second brake (B2) from among the gear-shift elements.

That is, by the first brake (B1), the second rotation element (C2) of the second planetary gear device (PG2) may be controlled to be either fixedly connected to the transmission case (CS) or to be maintained in a freely rotatable state. Further, by the second brake (B2), the first rotation element (S4) of the fourth planetary gear device (PG4) may be controlled to be either fixedly connected to the transmission case (CS) or to be maintained in a freely rotatable state.

The second rotation element (C1) of the first planetary gear device (PG1) and the input shaft (IN) are selectively connected by a first clutch (CL1) from among the gear-shift elements. The third rotation element (R3) of the third planetary gear device (PG3) and the input shaft (IN) are selectively connected by a second clutch (CL2) from among the gear-shift elements. The first rotation element (S2) of the second planetary gear device (PG2) and the first rotation element (S4) of the fourth planetary gear device (PG4) are selectively connected by a third clutch (CL3) from among the gear-shift elements. The first rotation element (S2) of the second planetary gear device (PG2) and the second rotation element (C4) of the fourth planetary gear device (PG4) are selectively connected by a fourth clutch (CL4) from among the gear-shift elements.

The first brake (B1), the second brake (B2), the first clutch (CL1), the second clutch (CL2), the third clutch (CL3), and the fourth clutch (CL4) are all controlled by a controller, which is not shown, according to the operation mode table shown in FIG. 2 in accordance with the running conditions of a vehicle, so that gear stages of ten forward gears and one backward gear of the vehicle may be configured.

The first brake (B1), the second brake (B2), the first clutch (CL1), the second clutch (CL2), the third clutch (CL3), and the fourth clutch (CL4) are commonly called "gear-shift elements." During a series of gear stages from a first gear to a tenth gear as shown in FIG. 2, the transmission of the present disclosure can perform so-called clutch-to-clutch gear shifting, which is performed by engaging one gear-shift element while releasing another gear-shift element.

The first rotation element of the first planetary gear device (PG1) includes a first sun gear (S1), the second rotation element of the first planetary gear device (PG1) includes a first carrier (C1), and the third rotation element of the first planetary gear device (PG1) includes a first ring gear (R1). The first rotation element of the second planetary gear device (PG2) includes a second sun gear (S2), the second rotation element of the second planetary gear device (PG2) includes a second carrier (C2), and the third rotation element of the second planetary gear device (PG2) includes a second ring gear (R2). The first rotation element of the third planetary gear device (PG3) includes a third sun gear (S3), the second rotation element of the third planetary gear device (PG3) includes a third carrier (C3), and the third rotation element of the third planetary gear device (PG3) includes a third ring gear (R3). The first rotation element of the fourth planetary gear device (PG4) includes a fourth sun gear (S4), the second rotation element of the fourth planetary gear device (PG4) includes a fourth carrier (C4), and the third rotation element of the fourth planetary gear device (PG4) includes a fourth ring gear (R4).

In addition, the multi-stage transmission of the present disclosure as described above may be described as follows. The multi-stage transmission includes: a first planetary gear device (PG1), a second planetary gear device (PG2), a third planetary gear device (PG3), and a fourth planetary gear device (PG4), each of which has three rotation elements; six gear-shift elements configured to variably provide a frictional force; and eight rotational shafts connected to the rotation elements of the planetary gear devices.

In this case, a first rotational shaft (RS1) is an input shaft (IN). A second rotational shaft (RS2) is directly connected to a first rotation element (S3) of the third planetary gear device (PG3), to a first rotation element (S1) of the first planetary gear device (PG1), and to a first rotation element (S2) of the second planetary gear device (PG2). A third rotational shaft (RS3) is directly connected to a second rotation element (C3) of the third planetary gear device (PG3), to a third rotation element (R1) of the first planetary gear device (PG1), and to a third rotation element (R4) of the fourth planetary gear device (PG4). A fourth rotational shaft (RS4) is directly connected to a third rotation element (R3) of the third planetary gear device (PG3). A fifth rotational shaft (RS5) is directly connected to a second rotation element (C1) of the first planetary gear device (PG1) and to a third rotation element (R2) of the second planetary gear device (PG2). A sixth rotational shaft (RS6) is directly connected to a second rotation element (C2) of the second planetary gear device (PG2). A seventh rotational shaft (RS7) is directly connected to a first rotation element (S4) of the fourth planetary gear device (PG4). An eighth rotational shaft (RS8) corresponds to an output shaft (OUT) which is directly connected to a second rotation element (C4) of the fourth planetary gear device (PG4).

Among the six gear-shift elements, a first brake (B1) is installed between the sixth rotational shaft (RS6) and a transmission case (CS). A second brake (B2) is installed between the seventh rotational shaft (RS7) and the transmission case (CS). A first clutch (CL1) is installed between the first rotational shaft (RS1) and the fifth rotational shaft (RS5). A second clutch (CL2) is installed between the first rotational shaft (RS1) and the fourth rotational shaft (RS4). A third clutch (CL3) is installed between the second rotational shaft (RS2) and the seventh rotational shaft (RS7). A fourth clutch (CL4) is installed between the second rotational shaft (RS2) and the eighth rotational shaft (RS8).

As described above, the multi-stage transmission of the present disclosure including four planetary gear devices and six gear-shift elements can implement ten forward gears and one backward gear according to the operation mode table shown in FIG. 2, and can implement ten gear stages with a relatively small number of components, a relatively straightforward configuration, and a low weight, so as to provide a more optimized gear-shift ratio in the running condition of a vehicle, thus improving the fuel efficiency of the vehicle.

Although the present disclosure has been shown and described with respect to specific embodiments thereof, it will be apparent to a person skilled in the art that various modifications and variations can be made in the present disclosure without departing from the technical idea of the present disclosure, which is provided by the following claims.

What is claimed is:

1. A multi-stage transmission for a vehicle, comprising:
an input shaft and an output shaft;
a first planetary gear device, a second planetary gear device, a third planetary gear device, and a fourth planetary gear device, each of which is disposed between the input shaft and the output shaft to transfer a rotational force and has three rotation elements; and
six gear-shift elements connected to the rotation elements of the planetary gear devices,
wherein a first rotation element of the third planetary gear device is fixedly connected to a first rotation element of the first planetary gear device and to a first rotation element of the second planetary gear device, and a second rotation element of the third planetary gear device is fixedly connected to a third rotation element of the first planetary gear device and to a third rotation element of the fourth planetary gear device;
a second rotation element of the first planetary gear device is fixedly connected to a third rotation element of the second planetary gear device;
a second rotation element of the fourth planetary gear device is fixedly connected to the output shaft;
a third rotation element of the third planetary gear device is selectively connected to the input shaft;
the second rotation element of the first planetary gear device is selectively connected to the input shaft;
the first rotation element of the second planetary gear device is selectively connected to each of a first rotation element and the second rotation element of the fourth planetary gear device, and a second rotation element of the second planetary gear device is selectively connected to a transmission case by one of the gear-shift elements; and the first rotation element of the fourth planetary gear device is selectively connected to the transmission case by another one of the gear-shift elements.

2. The multi-stage transmission for a vehicle of claim 1, wherein the third planetary gear device, the first planetary gear device, the second planetary gear device, and the fourth planetary gear device are arranged in order along an axial direction from the input shaft toward the output shaft.

3. The multi-stage transmission for a vehicle of claim 1, wherein: the gear-shift elements include a first and a second brake; the second rotation element of the second planetary gear device is selectively connected to the transmission case by the first brake; and the first rotation element of the fourth planetary gear device is selectively connected to the transmission case by the second brake.

4. The multi-stage transmission for a vehicle of claim 3, wherein:
the gear-shift elements include a first, a second, a third, and a fourth clutch;
the second rotation element of the first planetary gear device and the input shaft are selectively connected by the first clutch;
the third rotation element of the third planetary gear device and the input shaft are selectively connected by the second clutch;
the first rotation element of the second planetary gear device and the first rotation element of the fourth planetary gear device are selectively connected by the third clutch; and
the first rotation element of the second planetary gear device and the second rotation element of the fourth planetary gear device are selectively connected by the fourth clutch.

5. The multi-stage transmission for a vehicle of claim 1, wherein: the first rotation element, the second rotation element, and the third rotation element of the first planetary gear device comprise a first sun gear, a first carrier, and a first ring gear, respectively;
the first rotation element, the second rotation element, and the third rotation element of the second planetary gear device comprise a second sun gear, a second carrier, and a second ring gear, respectively;
the first rotation element, the second rotation element, and the third rotation element of the third planetary gear device comprise a third sun gear, a third carrier, and a third ring gear, respectively; and
the first rotation element, the second rotation element, and the third rotation element of the fourth planetary gear device comprise a fourth sun gear, a fourth carrier, and a fourth ring gear, respectively.

6. A multi-stage transmission for a vehicle, comprising:
a first planetary gear device, a second planetary gear device, a third planetary gear device, and a fourth planetary gear device, each of which has three rotation elements;
six gear-shift elements configured to variably provide a frictional force; and
eight rotational shafts configured to connect with the rotation elements of the planetary gear devices,
wherein a first rotational shaft is an input shaft;
a second rotational shaft is directly connected to a first rotation element of the third planetary gear device, to a first rotation element of the first planetary gear device, and to a first rotation element of the second planetary gear device;
a third rotational shaft is directly connected to a second rotation element of the third planetary gear device, to a third rotation element of the first planetary gear device, and to a third rotation element of the fourth planetary gear device;
a fourth rotational shaft is directly connected to a third rotation element of the third planetary gear device;
a fifth rotational shaft is directly connected to a second rotation element of the first planetary gear device and to a third rotation element of the second planetary gear device;
a sixth rotational shaft is directly connected to a second rotation element of the second planetary gear device;
a seventh rotational shaft is directly connected to a first rotation element of the fourth planetary gear device; and
an eighth rotational shaft corresponds to an output shaft and is directly connected to a second rotation element of the fourth planetary gear device;
wherein the six gear-shift elements comprise:
a first brake is installed between the sixth rotational shaft and a transmission case;
a second brake is installed between the seventh rotational shaft and the transmission case;
a first clutch is installed between the first rotational shaft and the fifth rotational shaft;
a second clutch is installed between the first rotational shaft and the fourth rotational shaft;
a third clutch is installed between the second rotational shaft and the seventh rotational shaft; and
a fourth clutch is installed between the second rotational shaft and the eighth rotational shaft.

7. The multi-stage transmission for a vehicle of claim 6, wherein the third planetary gear device, the first planetary gear device, the second planetary gear device, and the fourth planetary gear device are arranged in order along an axial direction from the input shaft toward the output shaft.

* * * * *